US008959743B2

(12) United States Patent
Mariano et al.

(10) Patent No.: US 8,959,743 B2
(45) Date of Patent: Feb. 24, 2015

(54) RETAINING RING REMOVAL TOOL

(75) Inventors: Thomas A. Mariano, Rocky Hill, CT (US); Christopher M. Juh, South Windsor, CT (US); Ronnie J. S. Vezzetti, Hebron, CT (US)

(73) Assignee: United Technologies Corporation, Hartford, CT (US)

( * ) Notice: Subject to any disclaimer, the term of this patent is extended or adjusted under 35 U.S.C. 154(b) by 129 days.

(21) Appl. No.: 13/486,277

(22) Filed: Jun. 1, 2012

(65) Prior Publication Data

US 2013/0318781 A1 Dec. 5, 2013

(51) Int. Cl.
*B23P 19/04* (2006.01)

(52) U.S. Cl.
USPC ........... 29/426.1; 29/426.6; 29/283.5; 29/225

(58) Field of Classification Search
CPC ...... B25B 27/20; B25B 27/205; B25B 31/00; B25B 17/12; B25B 27/0028; B23P 19/08; B23P 19/084
USPC ........... 29/426.1, 229, 426.5, 426.6, 235, 225
See application file for complete search history.

(56) References Cited

U.S. PATENT DOCUMENTS 3,234,824 A * 2/1966 Lyvers ......................... 29/283.5
4,130,399 A * 12/1978 Hallerback ..................... 29/225
4,175,310 A 11/1979 Boyd
4,416,054 A 11/1983 Thomas et al.
4,425,078 A 1/1984 Robbins
5,459,995 A 10/1995 Norton et al.
5,477,613 A 12/1995 Bales et al.
5,974,646 A 11/1999 Cotter
6,249,946 B1 6/2001 Greenhill
7,093,448 B2 8/2006 Nguyen et al.
7,334,980 B2 2/2008 Trinks et al.
8,038,389 B2 10/2011 Arness et al.
2009/0000096 A1 1/2009 Blok
2009/0229103 A1 9/2009 Alexander
2011/0061767 A1 3/2011 Vontell et al.
2011/0265302 A1 11/2011 Dalrymple

FOREIGN PATENT DOCUMENTS

EP 0901885 3/1999
JP 2006088262 4/2006

OTHER PUBLICATIONS

International Search Report and Written Opinion for International Application No. PCT/US2013/040507 completed on Aug. 16, 2013.
International Preliminary Report on Patentability for International Application No. PCT/US2013/040507, mailed Dec. 11, 2014.

* cited by examiner

*Primary Examiner* — David Bryant
*Assistant Examiner* — Jun Yoo
(74) *Attorney, Agent, or Firm* — Carlson, Gaskey & Olds, P.C.

(57) ABSTRACT

An example retaining ring removal tool includes a shaft extending along an axis from a first end to a second end, and at least one tapered tab extending axially from the first end of the shaft at a radially outer perimeter of the shaft.

6 Claims, 7 Drawing Sheets

RETAINING RING REMOVAL TOOL

BACKGROUND

This disclosure relates generally to retaining rings and, more particularly, to a tool used to remove retaining rings located in relatively inaccessible areas.

Retaining rings are a type of fastener. Retaining rings are used to retain components on shafts, for example. When retaining, a portion of the retaining ring may be received within a groove. Another portion of the retaining ring extends outside the groove. The retaining ring, which is fixed within the groove, blocks movement of the component away from the shaft.

Removing a retaining ring may be necessary during a repair or replacement procedure. Radial movement of the retaining ring is typically required to remove the retaining ring. Many retaining ring designs incorporate axially extending pinholes. A jaw-type tool includes pins that are received within the pinholes to remove the retaining ring. The jaws are actuated, which moves the pins circumferentially closer together, causing the retaining ring to collapse. Accessing retaining rings during removal is often difficult.

SUMMARY

A retaining ring removal tool according to an exemplary aspect of the present disclosure includes, among other things, a shaft extending along an axis from a first end to a second end, and at least one tapered tab extending axially from the first end of the shaft at a radially outer perimeter of the shaft.

In a further non-limiting embodiment of the foregoing retaining ring removal tool, the at least one tapered tab may comprise a plurality of tapered tabs distributed circumferentially about the axis.

In a further non-limiting embodiment of either of the foregoing retaining ring removal tools, the at least one tapered tab may have a radially outward facing surface and a radially inward facing surface. The radially inner facing surface may be configured to contact and radially compress a retaining ring when moved axially toward the retaining ring.

In a further non-limiting embodiment of either of the foregoing retaining ring removal tools, the radially inward facing surfaces is angled relative to the radially outward facing surface and the axis In a further non-limiting embodiment of any of the foregoing retaining ring removal tools, the shaft may be a first shaft including a bore extending from the first end to the second end. The second shaft that is longer than the first shaft may be received within the bore.

In a further non-limiting embodiment of any of the foregoing retaining ring removal tools, the second shaft may be a threaded shaft.

In a further non-limiting embodiment of any of the foregoing retaining ring removal tools, the retaining ring removal tool may include a fastener that engages the second shaft. The fastener may be configured to move the first and second shafts axially relative to each other.

In a further non-limiting embodiment of any of the foregoing retaining ring removal tools, the fastener may directly contact the first and the second shafts when moving the first and the second shafts relative to each other.

A retaining ring removal tool assembly according to another exemplary aspect of the present disclosure includes, among other things, an outer shaft having a bore extending along an axis, and an inner shaft received within the bore. The outer shaft and the inner shaft may be configured to move relative to each other to compress a retaining ring.

In a further non-limiting embodiment of the foregoing retaining ring removal tool assembly, the retaining ring may couple a component having a threaded portion to another component. The inner shaft may threadably engage the threaded component when compressing a retaining ring.

In a further non-limiting embodiment of either of the foregoing retaining ring removal tool assemblies, the outer shaft may include a plurality of axially extending tabs having surfaces that are tapered relative to the axis.

In a further non-limiting embodiment of any of the foregoing retaining ring removal tool assemblies, the outer shaft and the inner shaft may be configured to move axially relative to each other to compress the retaining ring radially.

An example retaining ring removal method according to another exemplary aspect of the present disclosure includes, among other things, moving a first shaft axially relative to a second shaft to move a retaining ring radially.

In a further non-limiting embodiment of the foregoing retaining ring removal method, the retaining ring may be moved radially inward.

In a further non-limiting embodiment of either of the foregoing retaining ring removal methods, the moving may comprise wedging a tapered surface of a tab against the retaining ring.

In a further non-limiting embodiment of any of the foregoing retaining ring removal methods, moving the retaining ring radially may move the retaining ring from an installed position to an uninstalled position.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
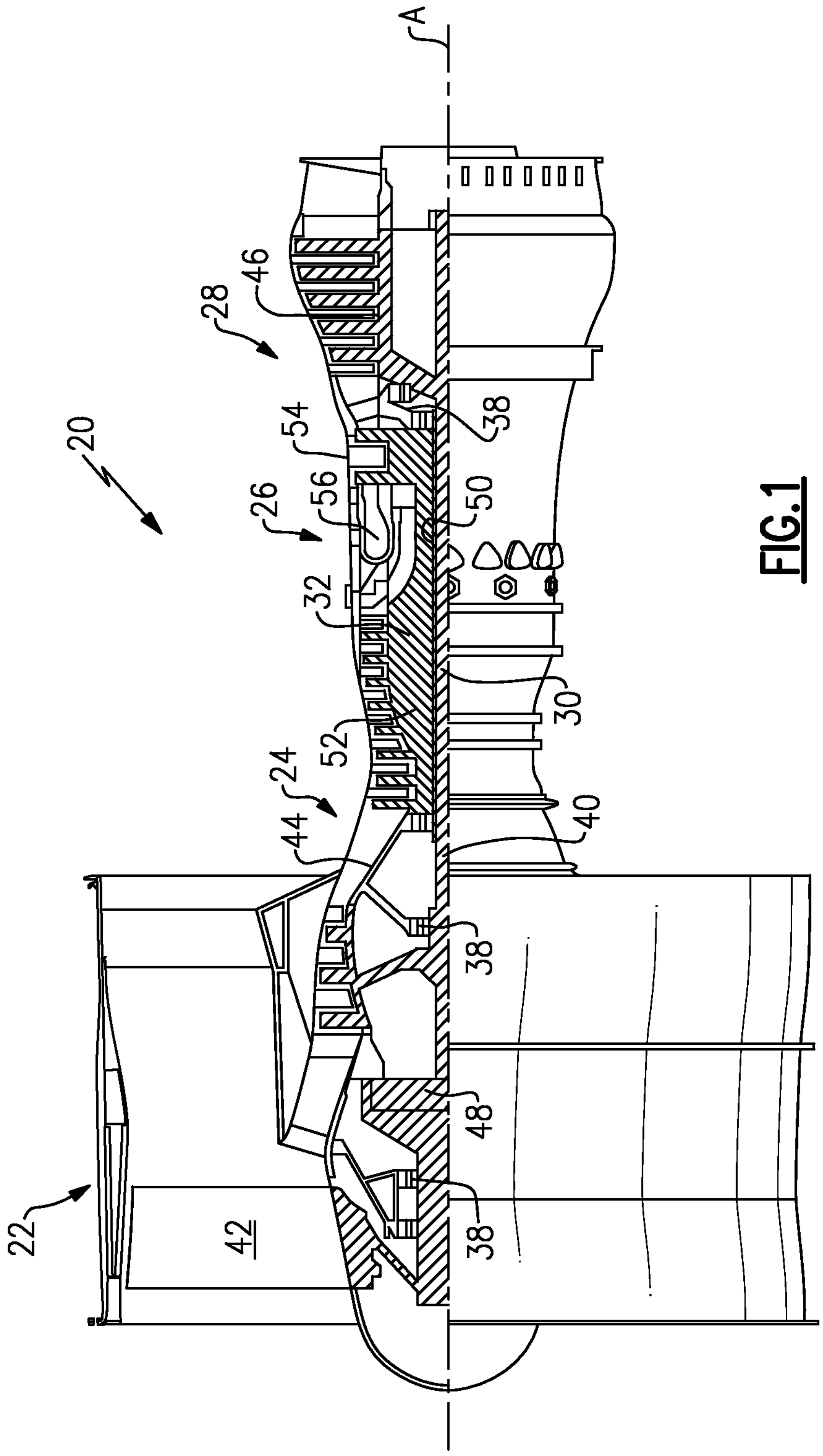
FIG. 1 shows a cross-section view of an example gas turbine engine.
Figure 2:
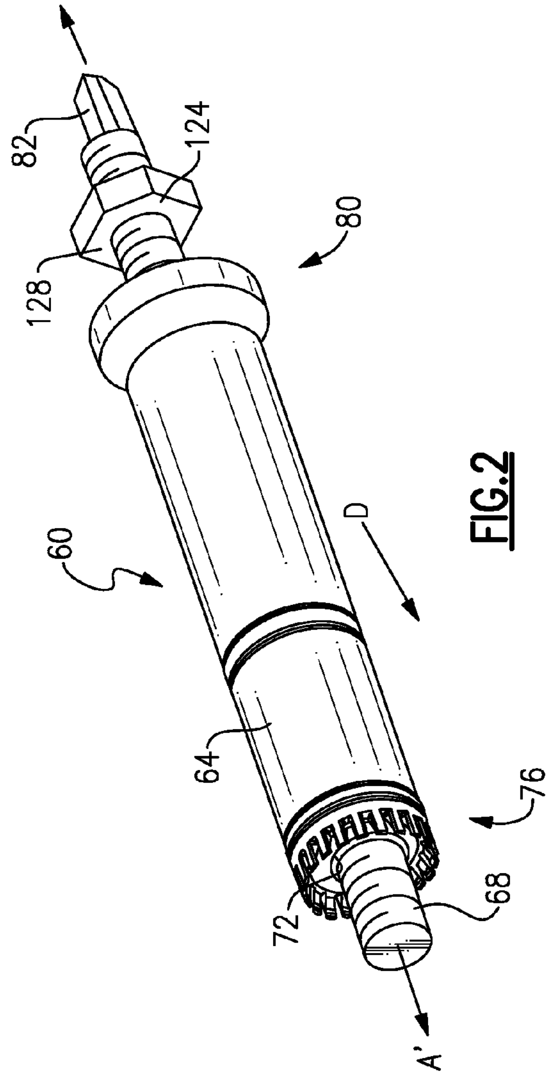
FIG. 2 shows a perspective view of an example retaining ring removal tool.
Figure 4:
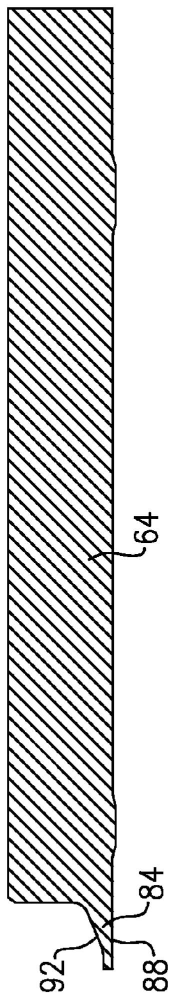
FIG. 4 shows a section view at line 4-4 in FIG. 3.
Figure 3:
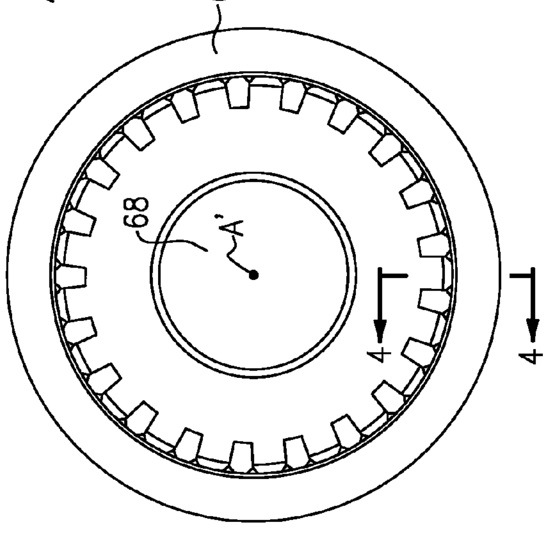
FIG. 3 shows an end view of the retaining ring removal tool of FIG. 2.
Figure 5:
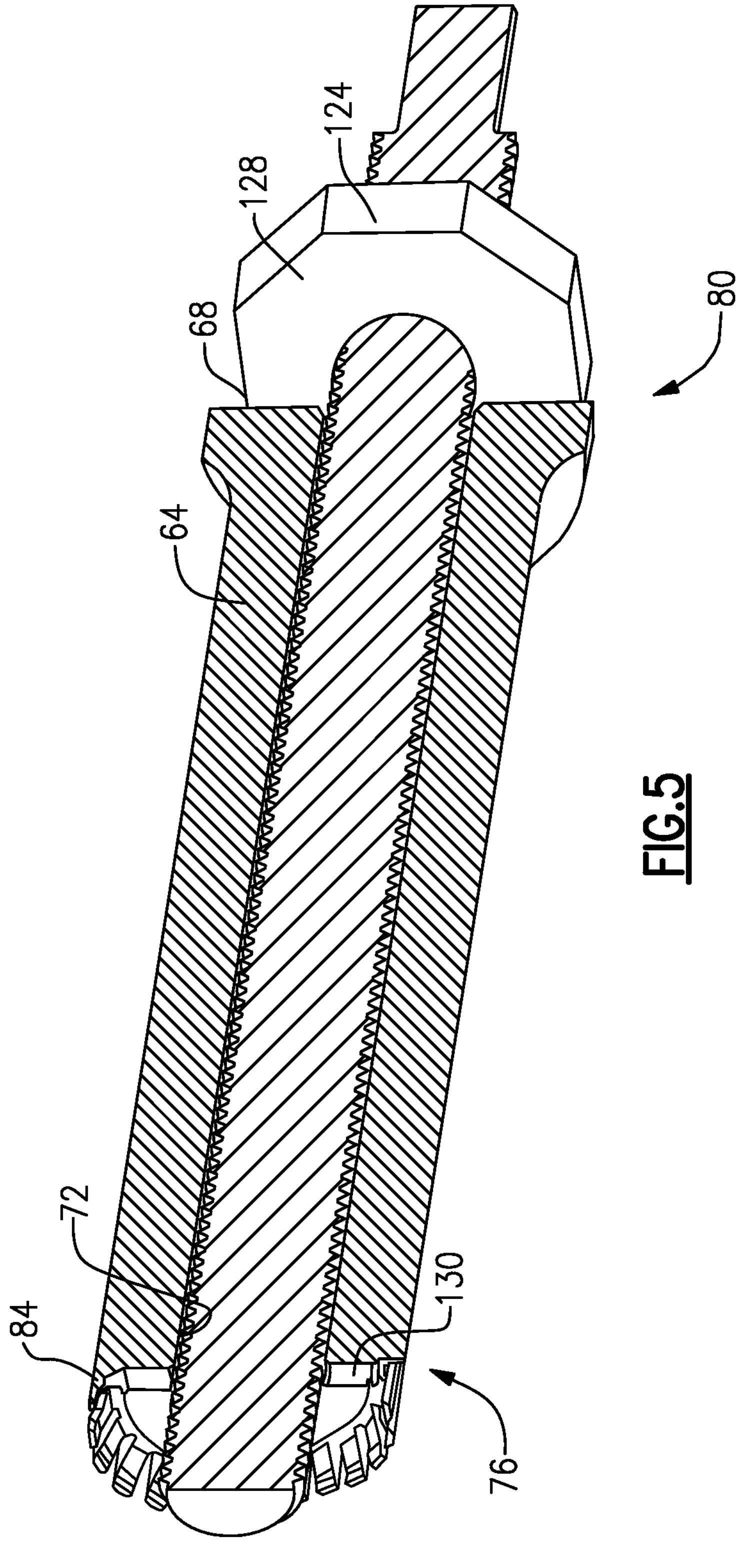
FIG. 5 shows a partial section view of the retaining ring removal tool of FIG. 2.
Figure 6:
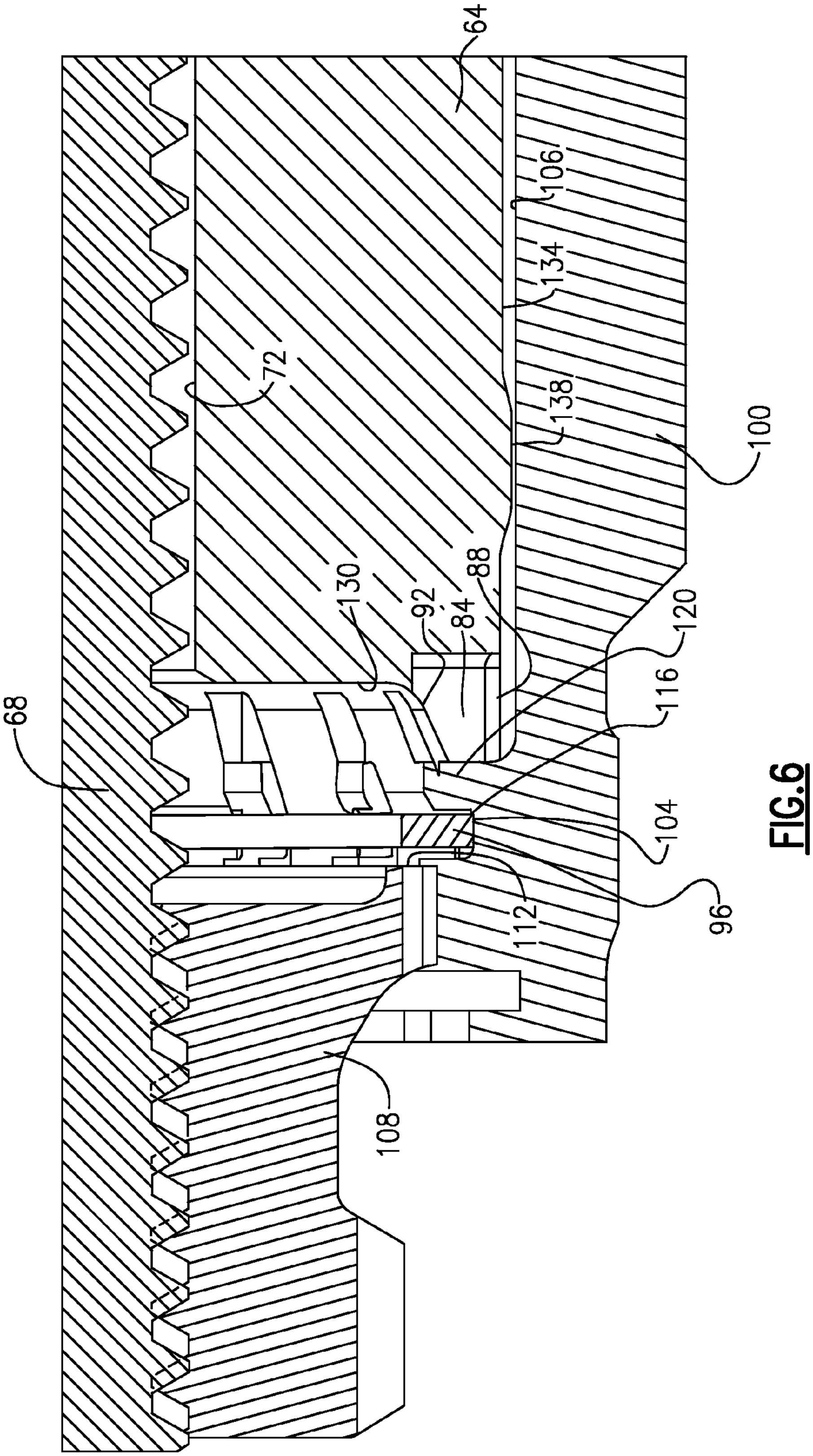
FIG. 6 shows a side view of an area of the retaining ring removal tool of FIG. 5 prior to compressing a retaining ring.
Figure 7:
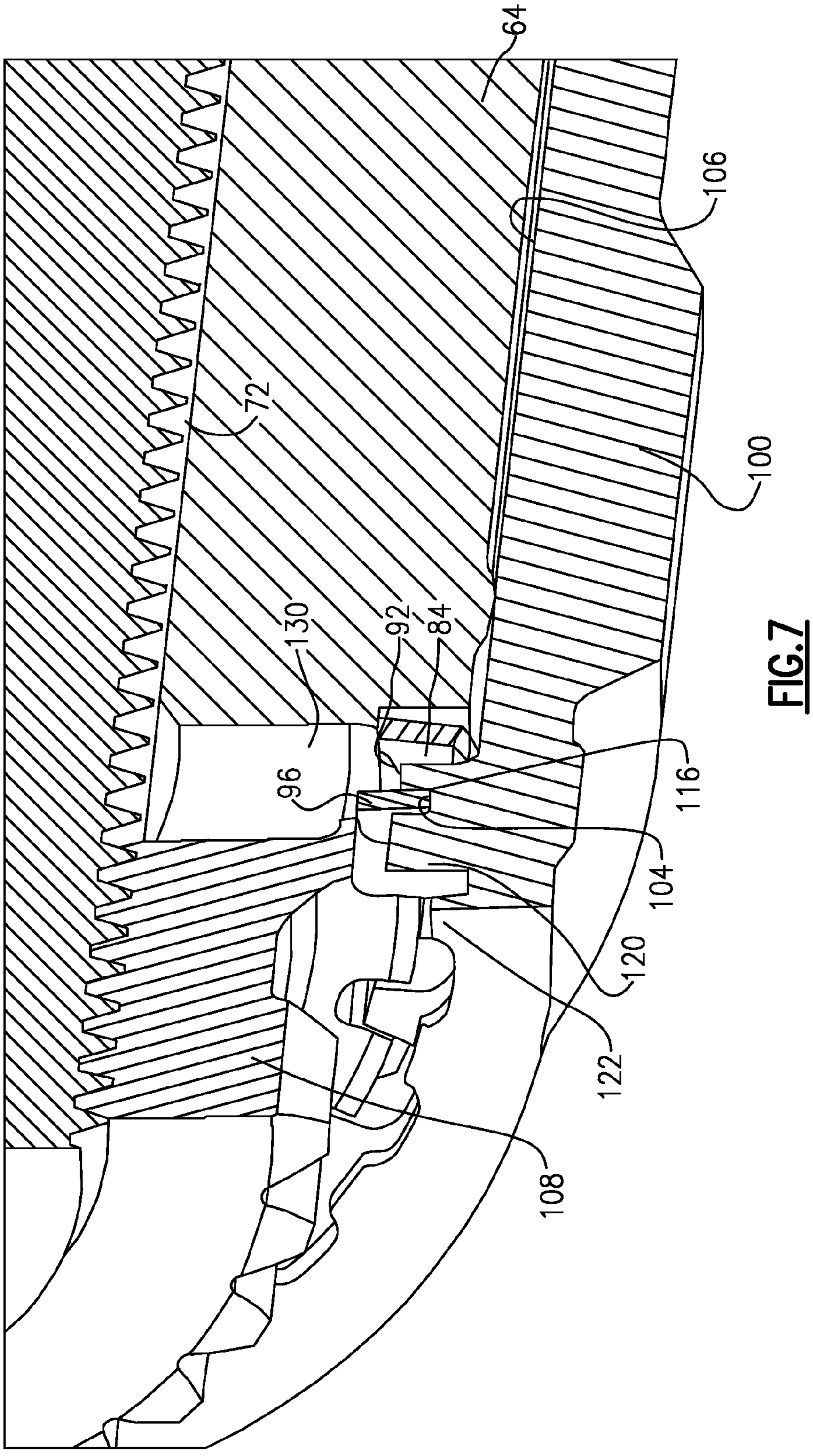
FIG. 7 shows a perspective view of the area of FIG. 6 prior to compressing the retaining ring.
Figure 8:
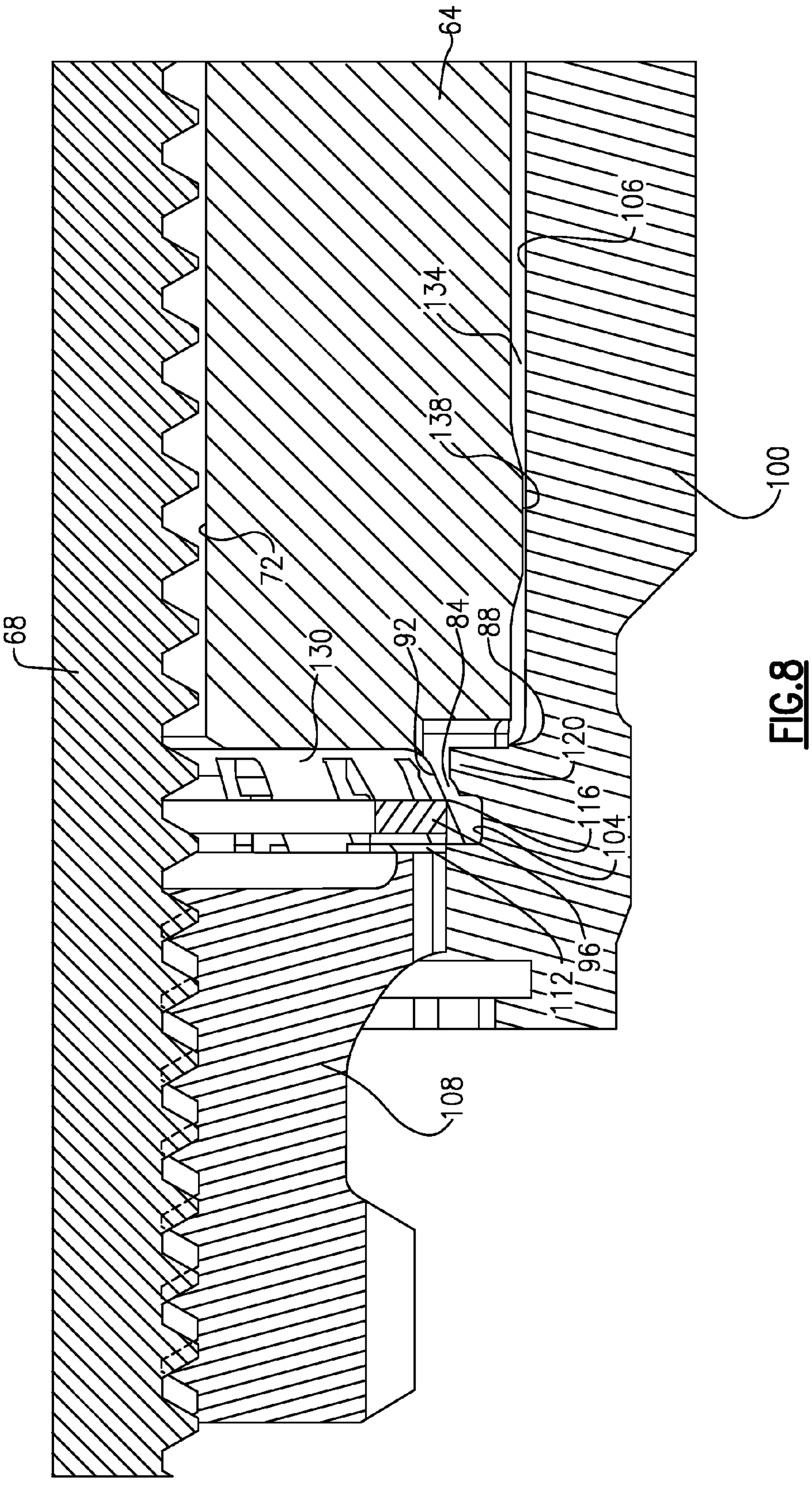
FIG. 8 shows a side view of the area of FIG. 6 after compressing the retaining ring.
Figure 9:
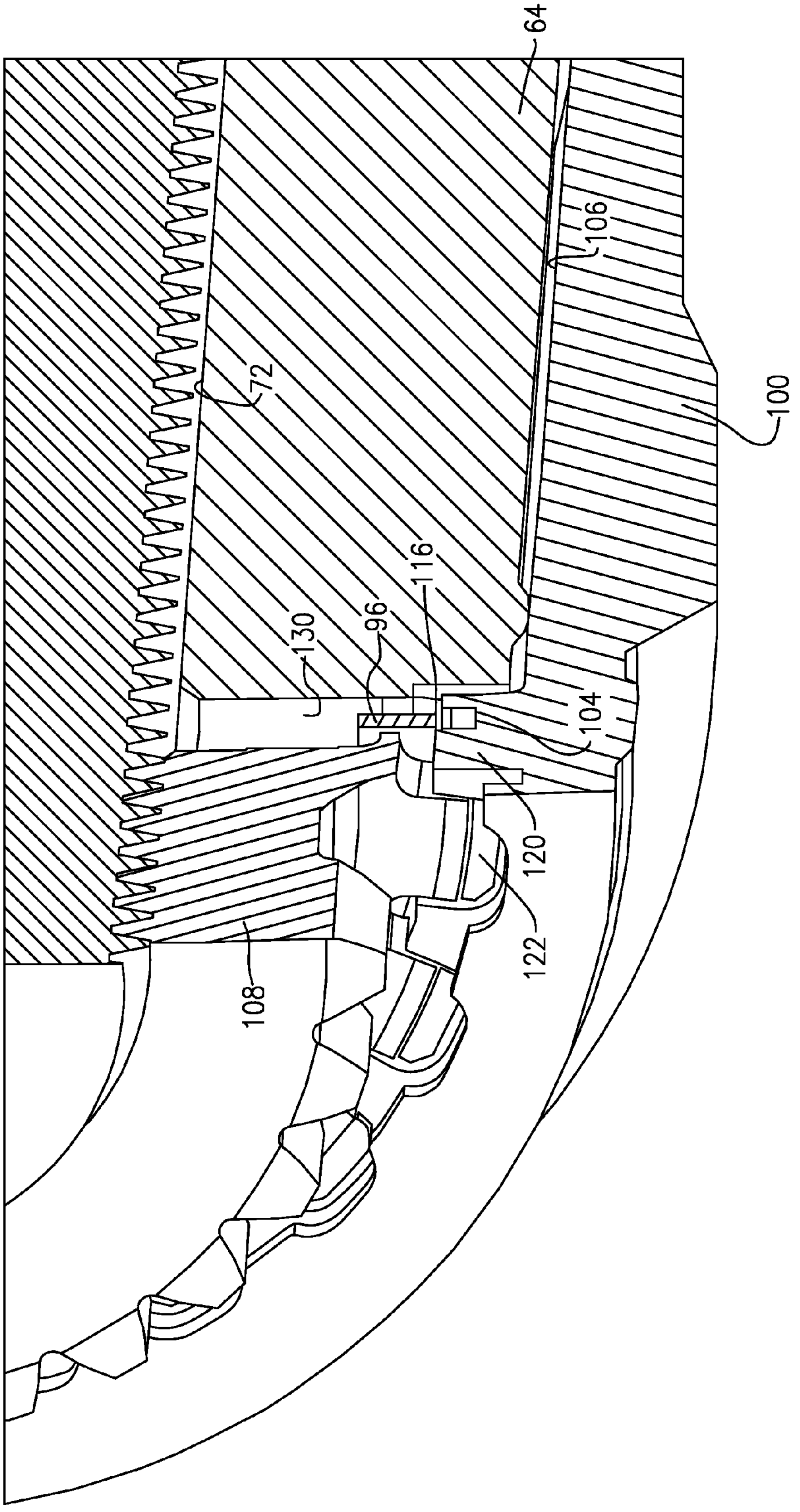
FIG. 9 shows a perspective view of the area of FIG. 6 after compressing the retaining ring.

FIG. 1 schematically illustrates an example turbomachine, which is a gas turbine engine 20 in this example. The gas turbine engine 20 is a two-spool turbofan gas turbine engine that generally includes a fan section 22, a compressor section 24, a combustion section 26, and a turbine section 28.

Although depicted as a two-spool turbofan gas turbine engine in the disclosed non-limiting embodiment, it should be understood that the concepts described herein are not limited to use with turbofans. That is, the teachings may be applied to other types of turbomachines and turbine engines including three-spool architectures. Further, the concepts described herein could be used in environments other than a turbomachine environment and in applications other than aerospace applications, such as automotive applications.

In the example engine 20, flow moves from the fan section 22 to a bypass flowpath. Flow from the bypass flowpath generates forward thrust. The compressor section 24 drives air along the core flowpath. Compressed air from the compressor section 24 communicates through the combustion section 26. The products of combustion expand through the turbine section 28.

The example engine 20 generally includes a low-speed spool 30 and a high-speed spool 32 mounted for rotation about an engine central axis A. The low-speed spool 30 and the high-speed spool 32 are rotatably supported by several bearing systems 38. It should be understood that various bearing systems 38 at various locations may alternatively, or additionally, be provided.

The low-speed spool 30 generally includes a shaft 40 that interconnects a fan 42, a low-pressure compressor 44, and a low-pressure turbine 46. The shaft 40 is connected to the fan 42 through a geared architecture 48 to drive the fan 42 at a lower speed than the low-speed spool 30.

The high-speed spool 32 includes a shaft 50 that interconnects a high-pressure compressor 52 and high-pressure turbine 54.

The shaft 40 and the shaft 50 are concentric and rotate via bearing systems 38 about the engine central longitudinal axis A, which is collinear with the longitudinal axes of the shaft 40 and the shaft 50.

The combustion section 26 includes a circumferentially distributed array of combustors 56 generally arranged axially between the high-pressure compressor 52 and the high-pressure turbine 54.

In some non-limiting examples, the engine 20 is a high-bypass geared aircraft engine. In a further example, the engine 20 bypass ratio is greater than about six (6 to 1).

The geared architecture 48 of the example engine 20 includes an epicyclic gear train, such as a planetary gear system or other gear system. The example epicyclic gear train has a gear reduction ratio of greater than about 2.3 (2.3 to 1).

The low-pressure turbine 46 pressure ratio is pressure measured prior to inlet of low-pressure turbine 46 as related to the pressure at the outlet of the low-pressure turbine 46 prior to an exhaust nozzle of the engine 20. In one non-limiting embodiment, the bypass ratio of the engine 20 is greater than about ten (10 to 1), the fan diameter is significantly larger than that of the low pressure compressor 44, and the low-pressure turbine 46 has a pressure ratio that is greater than about 5 (5 to 1). The geared architecture 48 of this embodiment is an epicyclic gear train with a gear reduction ratio of greater than about 2.5 (2.5 to 1). It should be understood, however, that the above parameters are only exemplary of one embodiment of a geared architecture engine and that the present disclosure is applicable to other gas turbine engines including direct drive turbofans.

In this embodiment of the example engine 20, a significant amount of thrust is provided by the bypass flow B due to the high bypass ratio. The fan section 22 of the engine 20 is designed for a particular flight condition—typically cruise at about 0.8 Mach and about 35,000 feet. This flight condition, with the engine 20 at its best fuel consumption, is also known as "Bucket Cruise" Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example engine 20 is less than 1.45 (1.45 to 1).

Low Corrected Fan Tip Speed is the actual fan tip speed divided by an industry standard temperature correction of Temperature divided by 518.7^0.5. The Temperature represents the ambient temperature in degrees Rankine. The Low Corrected Fan Tip Speed according to one non-limiting embodiment of the example engine 20 is less than about 1150 fps (351 m/s).

Various components of the engine 10 may be coupled together utilizing retaining rings. In one example the shaft 40 is coupled to a hub of the low-pressure compressor 44 using a retaining ring.

Referring to FIGS. 2 to 5 with continuing reference to FIG. 1, an example retaining ring removal tool 60 includes a first shaft and a second shaft. In this example, the first shaft is an outer tool shaft 64, and the second shaft is an inner tool shaft 68. The outer tool shaft 64 and inner tool shaft 68 extend along an axis A'. The outer tool shaft 64 includes a bore 72 extending from a first end 76 of the outer tool shaft 64 to a second end 80 of the outer tool shaft 64. The bore 72 receives the inner tool shaft 68.

The inner tool shaft 68 is longer than the outer tool shaft 64. Thus, when the inner tool shaft 68 is received within the bore 72, portions of the inner tool shaft 68 are able to extend axially past the first end 76 and the second end 80 of the outer tool shaft 64.

The inner tool shaft 68 is threaded. The bore 72 is not threaded. The diameter of the bore 72 is large enough to allow the inner tool shaft 68 to move axially within the bore 72 relative to the outer tool shaft 64. The inner tool shaft 68 may include tool engagement portion, such as a hexagonal area 82, to link the inner tool shaft 68 to a tool when rotating the inner tool shaft 68.

The first end 76 of the outer tool shaft 64 includes a plurality of tabs 84 that extend axially away from the other portions of the outer tool shaft 64. The tabs 84 are circumferentially distributed about the axis A'. Each of the tabs 84 includes a radially outward facing surface 88 and a radially inward facing surface 92. At least a portion of the radially inward facing surface 92 of the tabs 84 is angled relative to the axis A'. The radially inward facing surface 92 is also angled relative to the radially outward facing surface 88. The tabs 84 thus taper away from the other portions of the outer tool shaft 64. The example tabs 84 may be considered tapered or a wedge-shaped.

The example retaining ring removal tool 60 is utilized to remove a retaining ring 96 within the engine 20. In this example, the retaining ring 96 is located at a forward end of the engine 20 relative to a direct of flow through the engine. The example retaining ring 96 is the retaining ring coupling the shaft 40 to the hub of the low-pressure compressor 44.

Referring now to FIGS. 6 to 9 with continuing reference to FIGS. 1 to 5, the shaft 40 includes a coupling nut 100 having a circumferential groove 104 at one end of a bore 106. A portion of the retaining ring 96 is held within the groove 104 when the retaining ring 96 is in an installed position. Another portion of the retaining ring extends radially outside the groove 104.

An anti-rotation vernier 108 of the compressor 44 has a shoulder 112 that contacts the retaining ring 96 to prevent the anti-rotation vernier 108 of the low pressure turbine shaft from moving axially relative to the coupling nut 100 of the compressor hub 44. The retaining ring 96 in the installed position thus connects the coupling nut 100 to the anti-rotation vernier 108 to couple the compressor hub 44 to the shaft 40. These components remain coupled provided the retaining ring 96 remains in the installed position in the groove 104. Moving the retaining ring 96 to an uninstalled position allows the vernier ring to disengage from the coupling allowing the coupling to back off, losing the stack pre-load.

In some examples, the retaining ring 96 is located axially well within the bore 106 of the coupling nut 100. In some more specific examples, the retaining ring 96 may be located more than 40 inches (1016 millimeters) within the bore.

An example method of moving the retaining ring 96 to disengage the coupling nut 100 from the anti-rotation vernier 108 includes inserting the outer tool shaft 64 of the retaining ring removal tool 60 into the bore 106 of the coupling nut 100 until the tabs 84 contact a corner 116 of the retaining ring 96.

In this example, a side of the groove 104 within the coupling nut 100 is defined by radially inward extending ribs 120. Slots 122 are located between the ribs 120. The tabs 84 are received within the slots between the ribs 120 when the outer tool shaft 64 is moved axially within the coupling nut 100. The slots between the ribs 120 permit the tabs 84 to contact the corner 116 of the retaining ring. The sizes, count and spacing of the tabs 84 of the outer tool shaft 64 may be adjusted depending on the specific slot arrangement and rib 120 arrangement holding the retaining ring 96.

The inner tool shaft 68 threadably engages the anti-rotation vernier 108. A nut 124 or similar fastener engages an opposing end of the inner tool shaft 68. As the nut 124 is tightened, a surface 128 of the nut 124 contacts the second end 80 of the outer tool shaft 64. Tightening the nut 124 further on the inner tool shaft 68 causes the outer tool shaft 64 to move axially relative to the inner tool shaft 68 in a direction D. The tabs 84 are then forced under the corner 116 of the retaining ring 96. Tightening the nut 124 further causes the corner 116 to ride up on the radially inward facing surface 92 of the tabs 84, which radially compresses the retaining ring 96. When compressed radially, the retaining ring 96 can be moved outside of the groove 104.

The corner 116 continues to ride along the radially inward facing surface 92 as the nut 124 is tightened until the retaining ring 96 contacts an axially facing surface 130 of the outer tool shaft 64. The retaining ring removal tool 60 is then withdrawn from the bore 106. The retaining ring 96 is held by the vernier against the surface 130 and the retaining ring removal tool 60 is withdrawn.

In this example, an outer surface 134 of the outer tool shaft 64 includes centering the pilots 138, which are essentially raised areas of the outer surface 134. The diameter of the outer shaft at the centering pilots 138 is very close to the diameter of the bore within the coupling nut. The centering pilots 138 help to align the retaining ring removal tool 60 during an insertion into the bore 106 and retraction from the bore 106.

Features of the disclosed examples include a retaining ring removal tool that removes a retaining ring without engaging pinhole locations on a retaining ring. The retaining ring tool also relatively contains the retaining ring during removal, which prevents damage to the retaining ring and surrounding structures.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A retaining ring removal tool assembly, comprising:
an outer shaft having a bore extending along an axis; and
an inner shaft received within the bore, wherein the outer shaft and the inner shaft are configured to move relative to each other to compress a retaining ring, wherein the retaining ring couples a component having a threaded portion to another component, and the inner shaft threadably engages the component having the threaded portion when compressing the retaining ring.

2. The retaining ring removal tool assembly of claim 1, wherein the outer shaft includes a plurality of axially extending tabs having surfaces that are tapered relative to the axis.

3. The retaining ring removal tool assembly of claim 1, wherein the retaining ring is disposed about the axis and the compressing moves the retaining ring radially inward toward the axis.

4. The retaining ring removal tool assembly of claim 1, wherein the compressing decreases an innermost diameter of the retaining ring.

5. An assembly, comprising:
a shaft extending along an axis from a first end to a second end;
a plurality of tapered tabs distributed circumferentially about the axis and extending axially from the first end of the shaft at a radially outer perimeter of the shaft;
a retaining ring about the axis, the plurality of tapered tabs to receive and compress the retaining ring toward the axis, wherein the retaining ring couples a component having a threaded portion to another component, and the inner shaft threadably engages the component having the threaded portion when compressing the retaining ring.

6. The assembly of claim 5, wherein the plurality of tapered tabs compress the retaining ring radially inward toward the axis.

* * * * *